(12) United States Patent
Chi (10) Patent No.: US 10,393,520 B2
(45) Date of Patent: ***Aug. 27, 2019

(54) BUBBLE LEVEL USING REFLECTION

(71) Applicants:HANGZHOU GREAT STAR INDUSTRIAL CO., LTD., Hangzhou, Zhejiang Province (CN); HANGZHOU GREAT STAR TOOLS CO., LTD., Hangzhou, Zhejiang Province (CN)

(72) Inventor: Xiaoheng Chi, Hangzhou (CN)

(73) Assignees: HANGZHOU GREAT STAR INDUSTRIAL CO., LTD., Hangzhou, Zhejiang Province (CN); HANGZHOU GREAT STAR TOOLS CO., LTD., Hangzhou, Zhejiang Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,537

(22) Filed: Jan. 9, 2018

(65) Prior Publication Data

US 2018/0149477 A1    May 31, 2018

Related U.S. Application Data

(63) Continuation of application No. 14/369,897, filed as application No. PCT/CN2014/073965 on Mar. 24, 2014, now Pat. No. 9,891,047.

(51) Int. Cl.
*G01C 9/32* (2006.01)
*G01C 9/34* (2006.01)

(52) U.S. Cl.
CPC ............... *G01C 9/32* (2013.01); *G01C 9/34* (2013.01)

(58) Field of Classification Search
CPC ........................................................ G01C 9/32
(Continued)

(56) References Cited

U.S. PATENT DOCUMENTS

| 159,882 A | 2/1875 | Barnes |
| 236,282 A | 1/1881 | Vaughn |

(Continued)

FOREIGN PATENT DOCUMENTS

| CN | 2094034 U | 1/1992 |
| CN | 1242075 A | 1/2000 |

(Continued)

OTHER PUBLICATIONS

Supplementary European Search Report issued in European Application No. EP 14 88 6692 dated Nov. 9, 2017.

*Primary Examiner* — Christopher W Fulton
(74) *Attorney, Agent, or Firm* — Scully, Scott, Murphy & Presser, P.C.

(57) ABSTRACT

A bubble level using reflection has an elongate body, a first surface and a second surface, and a cavity which has an opening on the second surface and is arranged between the first surface and the second surface. A level arranged in the cavity has a non-opaque body having a sloping surface and a first observation surface. A bubble unit is mounted in the body of the level. The first surface is mounted between the first end of the bubble unit and the measured surface, and the first observation surface is mounted between the second end of the bubble unit and user. The bubble level which uses the reflection of light through the interface makes user can observe the bubble unit from the front when the user measures the verticality.

26 Claims, 5 Drawing Sheets

(58) Field of Classification Search
USPC .................................................. 33/379, 348.2
See application file for complete search history.

(56) References Cited

U.S. PATENT DOCUMENTS

| | | | |
|---|---|---|---|
| 934,698 A | 9/1909 | Seibert | |
| D116,941 S | 10/1939 | Gaasbeek | |
| 2,466,829 A | 4/1949 | Sprinkel | |
| 2,750,677 A | 6/1956 | Wirth | |
| 2,791,036 A | 5/1957 | Gericke | |
| 3,208,147 A | 9/1965 | Estes | |
| 4,103,430 A * | 8/1978 | Schrader | G01C 9/32 33/348 |
| 6,449,859 B1 | 9/2002 | Zugel et al. | |
| 6,968,626 B1 | 11/2005 | Wondracek | |
| 7,600,324 B2 | 10/2009 | Maruyama | |
| 7,731,709 B2 | 6/2010 | Wilson | |
| 7,900,366 B2 | 3/2011 | Spaulding | |
| D649,884 S | 12/2011 | Guess | |
| 8,359,757 B1 | 1/2013 | Ruys | |
| 8,522,466 B2 | 9/2013 | Arduini | |
| 9,891,047 B2 * | 2/2018 | Chi | G01C 9/34 |
| 2002/0174554 A1 | 11/2002 | Zugel et al. | |
| 2009/0320303 A1 | 12/2009 | Sparrow | |
| 2016/0258751 A1 | 9/2016 | Ben Josef et al. | |
| 2016/0334200 A1 | 11/2016 | Zhuang | |

FOREIGN PATENT DOCUMENTS

| | | |
|---|---|---|
| CN | 201081706 Y | 7/2008 |
| CN | 201382782 Y | 1/2010 |
| CN | 201680838 U | 12/2010 |
| CN | 204240990 U | 4/2015 |
| JP | 11-63982 A | 3/1999 |
| JP | 2001074451 A | 3/2001 |

* cited by examiner

BUBBLE LEVEL USING REFLECTION

FIELD OF THE INVENTION

The present invention relates to a bubble level using reflection, pertaining to measuring tools.

DESCRIPTION OF THE PRIOR ART

Bubble levels are measuring tools used for measuring the levelness and the verticality of a surface of an object. A general level uses the bottom surface as a datum plane, and the bottom surface of the level is laid against a surface of an object to be measured, and whether the measured surface is horizontal or vertical is judged by observing the corresponding level bubble in the level.

To measure whether a plane is horizontal or not, laying the level on the measured surface and observing whether the level bubble of the 180° bubble unit moves to the middle of the two scale lines on the bubble vial, if the level bubble is in the middle, the measured surface is horizontal; otherwise, the measured surface is not horizontal.

To measure whether a plane is vertical or not, putting the level against the measured surface and observing whether the level bubble of the 90° bubble unit moves to the middle of the two scale lines on the bubble vial, if the level bubble is in the middle, the measured surface is vertical; otherwise, the measured surface is not vertical.

As one can only observe the level bubble in a common 90° bubble unit from the side of the level, it is not convenient when using the level especially in some special occasions when the side is blocked; therefore, a bubble level using reflection is invented where the location of the bubble can be observed in the direction facing the measured surface by means of mirror reflection. However, such bubble level using reflection requires the mirror to be installed into the bubble level, the manufacturing of which is relatively complex, and the production cost of which is relatively high.

SUMMARY OF THE INVENTION

For the problems in the prior art, the present invention provides a level where the verticality is measured observing from the front. The manufacturing is simple and the cost is low.

The present invention provides a level, including:
a body, which is a non-opaque body, having a datum face for measuring a verticality of a measured surface, a sloping surface intersecting with the datum face and a first observation surface;
a bubble unit, which is arranged in the body, the longitudinal axis of the bubble unit being perpendicular to the datum face which is arranged between a first end of the bubble unit and the measured surface, the first observation surface being opposed to the datum face and arranged between a second end of the bubble unit and a user;
the sloping surface and the datum face form an obtuse angle at one side where the bubble unit is arranged, the reflection by the sloping surface forming an image of the bubble unit;
the user can observe the image of the bubble unit reflected by the sloping surface from the first observation surface.

Further, the body is formed integrally, and the sloping surface for reflecting the bubble unit is formed in the integral forming process, where additional assemblies and calibrations are not needed, so that the manufacturing is simple and the cost is low.

Further, the body is a transparent body which facilitates the light transmission in the body to form a clear image of the bubble unit.

Further, the body also includes a second observation surface which is a side surface of the body, and the user can directly observe the bubble unit from the second observation surface.

Further, the number of the sloping surface is one.

Further, the number of the sloping surfaces is two, and the images of the bubble unit reflected by the sloping surfaces are observed from both sides of the bubble unit, which increases the viewing angle range for observing the images of the bubble unit reflected by the sloping surfaces.

Further, two sloping surfaces are symmetrically arranged about the bubble unit, and the two images reflected by these two sloping surfaces are observed from a second end of the bubble unit at the same time, and can test whether the processing of the level is precise based on whether the two images are consistent or not.

Further, the bubble unit is an independent component that is mounted in a hole of the body.

Further, the an outer wall of the bubble unit is a hole wall of a hole of the body. The hole wall of the hole of the body which is formed integrally is used as the outer wall of the bubble unit, and constitutes the bubble unit after adding the liquid and the gas and sealing.

Further, a film is coated on the sloping surface so as to enhance the brightness of the reflected image.

Further, the obtuse angle formed by the sloping surface and the datum face at a side where the bubble unit is arranged is ranged from 120°-150°.

Further, the obtuse angle formed by the sloping surface and the datum face at a side where the bubble unit is arranged is 135°.

The present invention provides a bubble level using reflection, including:
an elongate body which includes a first surface and a second surface, a cavity being arranged between the first surface and the second surface, which cavity has an opening on the second surface, the first surface being a datum face for measuring the measured surface;
a level is arranged in the cavity, including:
a body, which is a non-opaque body, having a sloping surface and a first observation surface;
a bubble unit which is arranged in the body, a longitudinal axis of the bubble unit being perpendicular to the first surface which is arranged between a first end of the bubble unit and the measured surface, the first observation surface being opposed to the first surface and arranged between a second end of the bubble unit and a user;
the sloping surface and the first surface form an obtuse angle at a side where the bubble unit is arranged, the reflection by the sloping surface forming an image of the bubble unit;
the user can observe the image of the bubble unit reflected by the sloping surface from the first observation surface;
the user can observe the first observation surface of the level through the opening of the second surface.

Further, the body of the level is formed integrally, and the sloping surface for reflecting bubble unit is formed in the integral forming process, and additional assemblies and calibrations are not needed, so that the manufacturing is simple and the cost is low.

Further, body of the level is a transparent body which facilitates the light transmission in the body to form a clear image of the bubble unit.

Further, the body of the level includes a second observation surface which is a side surface of the body, and the user can directly observe the bubble unit from the second observation surface.

Further, a window part is arranged at the opening of the second surface.

Further, the body of the level includes a third surface and a forth surface that are opposedly arranged, the cavity has an opening on the third surface and/or the forth surface, the user can observe the second observation surface of the level from the opening on the third surface and/or the forth surface.

Further, a window part is arranged at the opening of the third surface and/or the forth surface.

Further, the number of sloping surface of the body of the level is one or two, and when the number of sloping surface is two, the images of bubble unit reflected by the sloping surfaces can be observed from both sides of the bubble unit, which increases the observation range for observing the images of the bubble unit by the reflection of the sloping surfaces.

Further, when the number of the sloping surface of the body of the level is one, the sloping surface of the body of the level is closer to a longitudinal midpoint of the level body of the bubble level using reflection than the bubble unit of the level.

Further, when the number of the sloping surface of the body of the level is one, the bubble unit of the level is closer to a longitudinal midpoint of the level body of the bubble level using reflection than the sloping surface of the body of the level.

Further, the level also includes a first bubble unit which is arranged in the middle part of the body of the level; a longitudinal axis of the first bubble unit for measuring the levelness of the measured surface is parallel to the first surface.

Further, the body of the level also includes the first end and the second end.

Further, the level is arranged in the first end or the second end of the body of the level.

Further, end caps are mounted on the first end and the second end of the body of the level respectively. The first surface of the body of the level is the datum face which has highly accurate flatness and smoothness. In order to protect the datum face, the end caps, typically made of plastic, are mounted respectively on the first end and the second end of the level body of the bubble level using reflection.

Further, the level also includes an illumination means which is arranged between the first surface and the level, and the brightness of the bubble unit is enhanced by means of the illumination means, so as to enhance the brightness of the reflected image.

Further, the illumination means is an LED light.

Compared with the prior art, the beneficial effects of the level and the level provided by the present invention are as follows:

(1) The reflection and refraction of light are utilized when the light passes through the interface when entering optically sparse material from optically dense material (or entering optically dense material from optically sparse material). The body of the level for measuring the verticality is a transparent body formed integrally, and the sloping surface for reflecting the bubble unit is formed in the integral forming process, where additional assemblies and calibrations are not needed, so that the manufacturing is simple and the cost is low.

(2) Compared with the reflector, the brightness of the image reflected by the sloping surface of the body is weaker, and coating a film on the sloping surface and/or installing the illumination means can enhance the brightness of the reflected image.

Referencing now to the figures, the conception, detailed structure and induced technical effects of the present invention will be expounded for understanding of the purpose, characterizations and effects of the present invention:

DETAILED DESCRIPTION OF THE PREFERRED EMBODIMENTS

Figure 1:
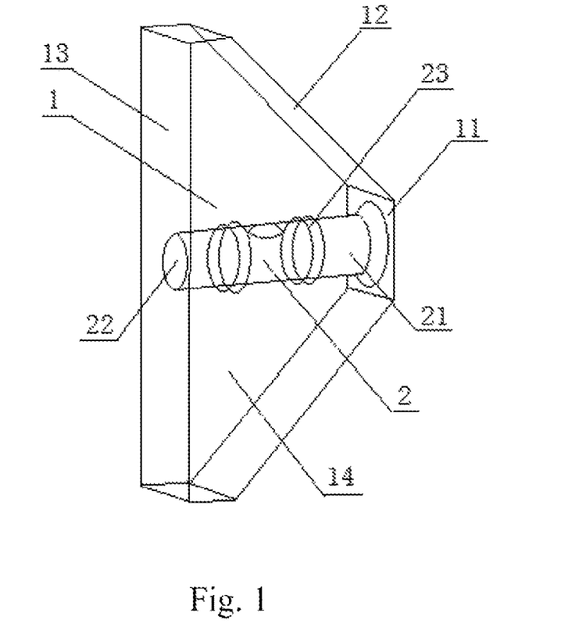
FIG. 1 is a perspective view of the level with two sloping surfaces in an embodiment of the present invention.
Figure 2:
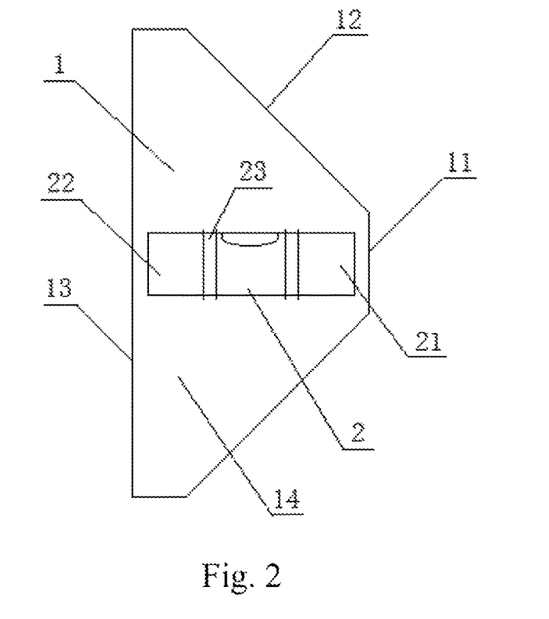
FIG. 2 is a side view of the level shown in FIG. 1.

As shown in FIG. 1 and FIG. 2, the level in an embodiment of the present invention includes:

a body 1, which is a non-opaque body, having a datum face 11 for measuring the verticality of the measured surface, a sloping surface 12 intersecting with the datum face 11 and a first observation surface 13;

a bubble unit 2 arranged in the body 1, the longitudinal axis of the bubble unit 2 being perpendicular to the datum face 11, which datum face is arranged between a first end 21 of the bubble unit 2 and the measured surface, the first observation surface 13 being opposed to the datum face 11 and arranged between a second end 22 of the bubble unit 2 and the user;

the sloping surface 12 and the datum face 11 forming an obtuse angle at a side where the bubble unit 2 is arranged, the reflection by the sloping surface 12 forming an image of the bubble unit 2;

the user can observe the image of the bubble unit 2 reflected by the sloping surface 12 from the first observation surface 13.

When using the level in the embodiment to measure the verticality, the user can observe the image of the bubble unit 2 reflected by the sloping surface 12 from the first observation surface 13, as well as observe the bubble unit 2 from the side of the level, i.e., directly observe the bubble unit 2 from the second observation surface 14, so that it is more convenient to measure the verticality.

The image of the bubble unit 2 includes a bubble floating in the bubble unit and the scale lines 23 located at both sides of the longitudinal midpoint of the bubble unit 2.

The obtuse angle formed by the sloping surface 12 and the datum face 11 at the side of arranging the bubble unit 2 is ranged from 120° to 150°, which in this embodiment is 135°.

The body 1 is formed integrally, and the sloping surface 12 for reflecting the bubble unit 2 is formed in the integral forming process, where additional assemblies and calibrations are not needed, so that the production is simple and the cost is low.

The body 1 is a transparent body which facilitates the light transmission in the body 1 to form a clear image of the bubble unit 2.

The body also includes the second observation surface 14 which is a side surface of the body 1, and the user can directly observe the bubble unit 2 from the second observation surface 14.

In the embodiment, the number of the sloping surfaces 12 is two, and the user can observe the image of the bubble unit 2 reflected by the sloping surfaces 12 from both sides of the bubble unit 2, increasing the observation range for observing the image of the bubble unit 2 reflected by the sloping surfaces 12.

The two sloping surfaces 12 are symmetrically arranged about the bubble unit 2, and the user can observe the images of these two sloping surfaces 12 at the same time from the second end 22 of the bubble unit 2, and can test whether the processing of the level is precise based on whether the two images are consistent or not.

Figure 3:
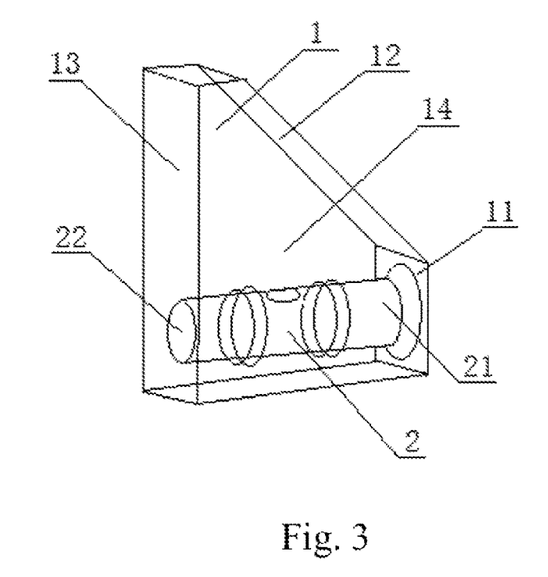
FIG. 3 is a perspective view of the level with a single sloping surface in another embodiment of the present invention.

As shown in the FIG. 3, the number of the sloping surface 12 is one in another embodiment of the present invention.

Figure 4:
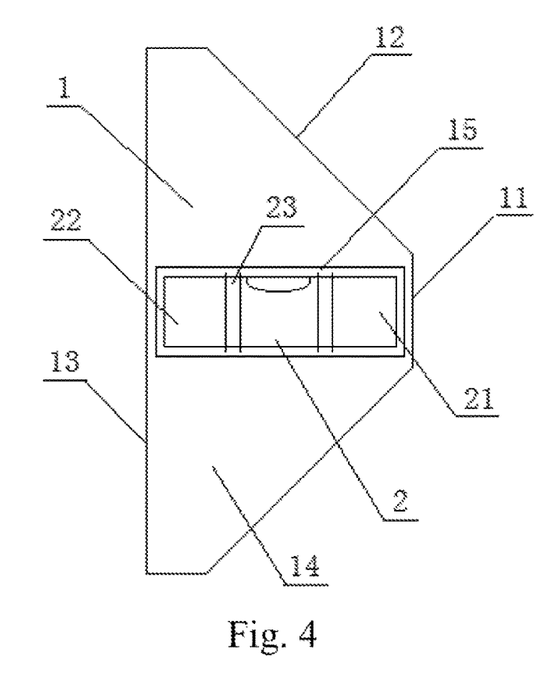
FIG. 4 is a side view of the level with an independent bubble unit in another embodiment of the present invention.

As shown in the FIG. 4, in another embodiment of the present invention, the bubble unit 2 is an independent unit mounted in a hole 15 of the body 1.

In another embodiment of the present invention, the outer wall of the bubble unit 2 is the hole wall of the hole 15 of the body 1. The hole wall of the hole 15 of the body 1 which is formed integrally is used as the outer wall of the bubble unit 2, and constitutes the bubble unit 2 after adding the liquid and gas and sealing.

Compared with a reflector, the brightness of the image reflected by the sloping surface of the body is weaker. Therefore a film is coated on the sloping surface 12 so as to enhance the brightness of the reflected image.

Figure 5:
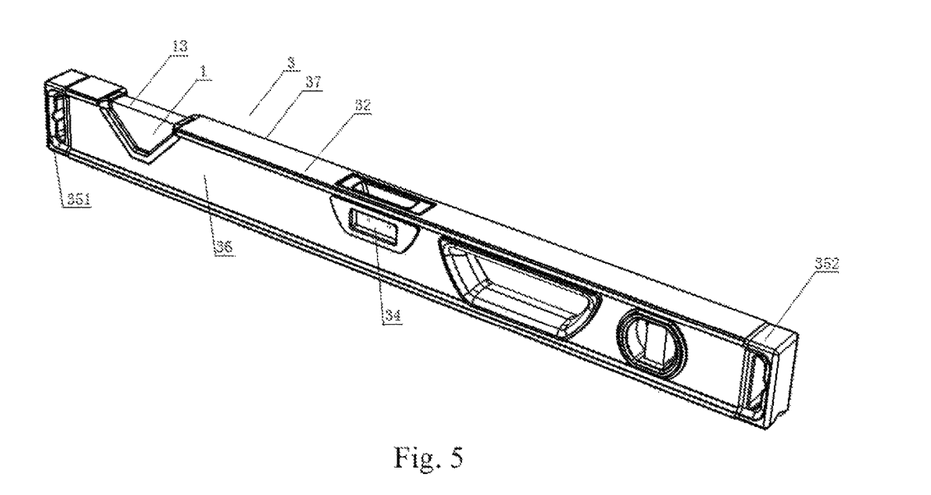
FIG. 5 is a perspective view of the bubble level with a reflector installed with a level having two sloping surfaces in another embodiment of the present invention.
Figure 6:
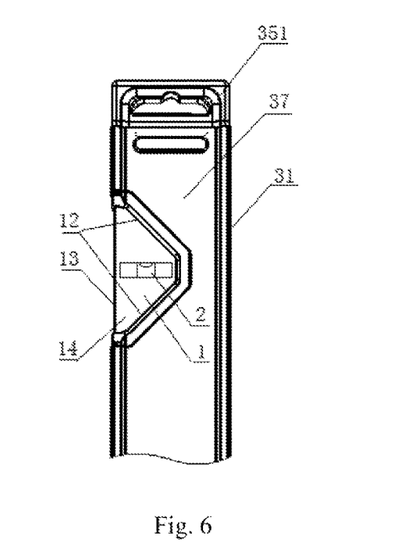
FIG. 6 is a partial side view of the bubble level using reflection shown in FIG. 5.

As shown in the FIG. 5 and FIG. 6, the bubble level using reflection 3 in another embodiment of the present invention, includes:
an elongate level body which includes a first surface 31 and a second surface 32, a cavity being arranged between the first surface 31 and the second surface 32, which cavity has an opening on the second surface 32, the first surface 31 being a datum face for measuring a measured surface;
a level arranged in the cavity, including:
a body 1, which is a non-opaque body, having a sloping surface 12 and a first observation surface 13;
a bubble unit 2 which is arranged in the body 1, a longitudinal axis of the bubble unit 2 being perpendicular to the first surface 31 which is arranged between a first end 21 of the bubble unit 2 and the measured surface, the first observation surface 13 being opposed to the first surface and arranged between a second end 22 of the bubble unit 2 and the user; the sloping surface 12 and the first surface 31 forming an obtuse angle at a side where the bubble unit 2 is arranged, the reflection by the sloping surface 12 forming an image of the bubble unit 2;
the user can observe the image of the bubble unit 2 reflected by the sloping surface 12 from the first observation surface 13; and
the user can observe the first observation surface 13 of the level through the opening of the second surface 32 so as to observe the image of the bubble unit 2 reflected by the sloping surface 12.

The body 1 is formed integrally, and the sloping surface 12 for reflecting the bubble unit 2 is formed in the integral forming process, where additional assemblies and calibrations are not needed, so that the production is simple and the cost is low.

The body 1 of the level is a transparent body which facilitates the light transmission in the body 1 to form a clear image of the bubble unit 2.

The body 1 of the level also includes a second observation surface 14 which is a side surface of the body 1, and the user can directly observe the bubble unit 2 from the second observation surface 14.

The bubble level using reflection also includes a first bubble unit 34 which is arranged in the middle part of the level body of the bubble level using reflection 3, a longitudinal axis of the first bubble unit 34 being parallel to the first surface 31, and the first bubble unit 34 is used for measuring the levelness of the measured surface.

The number of the sloping surface 12 of the body of the level is one or two.

In this embodiment, the number of the sloping surface 12 of the level is two, and the user can observe the image of the bubble unit 2 reflected by the sloping surfaces 12 from both sides of the bubble unit 2, increasing the observation range for observing the image of the bubble unit 2 reflected by the sloping surfaces 12; the user can observe the images of these two sloping surfaces 12 at the same time from the second end 22 of the bubble unit 2, and can test whether the processing of the level is precise based on whether the two images are consistent or not.

Figure 7:
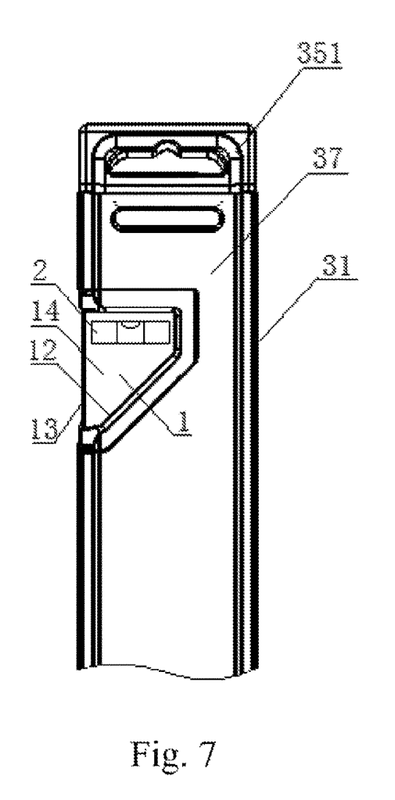
FIG. 7 is a partial side view of the bubble level using reflection installed with a level having one sloping surface in another embodiment of the present invention.

As shown in the FIG. 7, for a bubble level using reflection is a further embodiment, when the number of sloping surface 12 of the body of the level is one, the sloping surface 12 of the body of the level is closer to a longitudinal midpoint of the level body of the bubble level 3 using reflection than the bubble unit 2 of the level.

Figure 8:
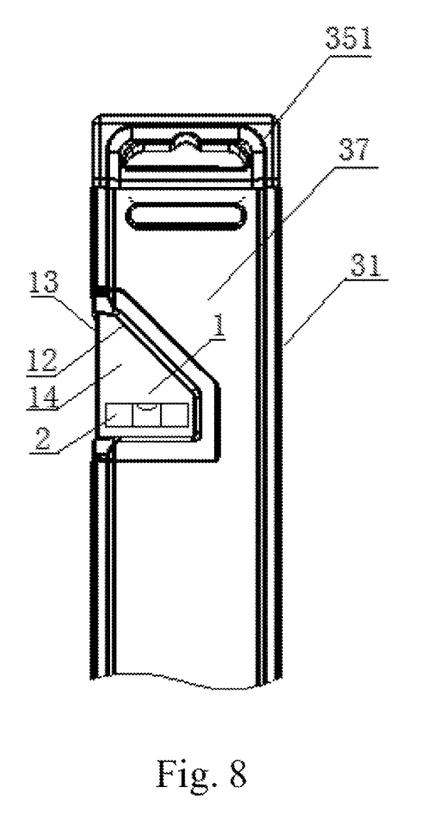
FIG. 8 is a partial side view of the bubble level using reflection installed with a level having one sloping surface in another embodiment of the present invention.

As shown in the FIG. 8, for a bubble level using reflection is a further embodiment, when the number of sloping surface of the body of the level is one, the bubble unit 2 of the level is closer to the longitudinal midpoint of the level body of the bubble level using reflection 3 than the sloping surface 12 of the body of the level.

The body of the bubble level using reflection also includes a first end 351 and a second end 352.

The level is arranged in the first end 351 or the second end 352 of the level body of the bubble level using reflection 3.

End caps are arranged on the first end 351 and the second end 352 of the level body of the bubble level using reflection 3 respectively, and the first surface 31 of the level body of the bubble level using reflection 3 is the datum face which has highly accurate flatness and smoothness. In order to protect the datum face, the end caps, typically made of plastic, are arranged on the first 351 end and the second end 352 of the body of the bubble level using reflection 3 respectively.

Figure 9:
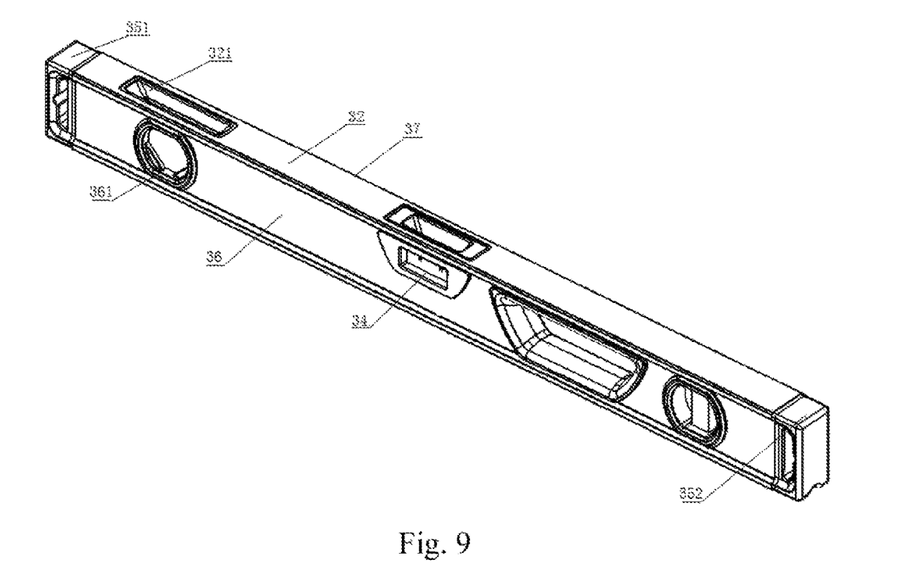
FIG. 9 is a perspective view of the bubble level using reflection arranged with window parts.

As shown in the FIG. 9, for a bubble level using reflection 3 in a further embodiment of the present invention, a window part 321 is arranged at the opening of the second surface 32, and the image of bubble unit 2 reflected by the sloping surface can be observed through the window part 321.

In another embodiment of the present invention, the level body of the bubble level using reflection 3 also includes a third surface 36 and a forth surface 37 that are opposedly arranged. The cavity has an opening on the third surface 36 and/or the forth surface 37, and the user can observe the second observation surface 14 of the level from the opening(s) on the third surface 36 and/or the forth surface 37.

A window part 361 is arranged at the opening of the third surface 36 and/or a window part is arranged at the opening of the forth surface 37, and the bubble unit 2 can be observed directly from the window part.

Figure 10:
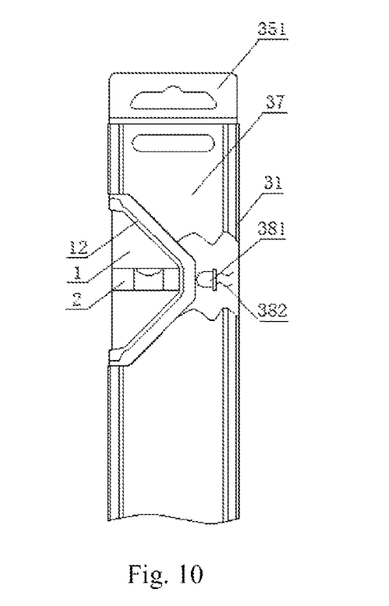
FIG. 10 is a partial side view of the bubble level using reflection arranged with illumination means.

As shown in the FIG. 10, the bubble level using reflection 3 also includes an illumination means 381 arranged between the first surface 31 and the level and coupled to a power supply via a wire 382, the brightness of the bubble unit 2 being enhanced by the illumination means 381, so as to enhance the brightness of the reflected image.

The illumination means 381 is an LED light.

The level and the bubble level using reflection for measuring verticality, provided by the present invention, utilize the reflection and refraction of light when the light passes through the interface when entering optically sparse material from optically dense material (or entering optically dense material from optically sparse material). The body of the level for measuring the verticality is a transparent body formed integrally, and the sloping surface for reflecting the bubble unit is formed in the integral forming process, where additional assemblies and calibrations are not needed, so that the manufacturing is simple and the cost is low. Compared with a reflector, the brightness of the image reflected by the sloping surface of the body is weaker, and the brightness of the reflected image is enhance by coating a film on the sloping surface and/or installing the illumination means.

The ongoing description details the preferable embodiments of the invention. It should be understood that with the general technicians of this field, no inventive work is necessary as to make multiple amendments and changes according to conception of this invention. Therefore, all the technical schemes gained from logical analysis, deductions or limited experimentation based on the present invention by technicians in this field, should be considered within the protection range asserted in the Claims.

The invention claimed is:

1. A level, comprising:
   a body, which is a non-opaque body, having a datum face for measuring a verticality of a measured surface, at least one sloping surface intersecting with the datum face, and a first observation surface;
   a bubble unit arranged inside the body, the bubble unit having a longitudinal axis that is perpendicular to the datum face, the datum face being arranged between a first end of the bubble unit and the measured surface, and the first observation surface being parallel to the datum face and being arranged between a second end of the bubble unit and a user;
   wherein the sloping surface and the datum face form an obtuse angle at a side where the bubble unit is arranged, the reflection by the sloping surface forming an image of the bubble unit; and
   wherein the image of the bubble unit reflected by the sloping surface is observable by the user from the first observation surface;
   wherein the body further comprises a second observation surface which is a side of the body; and the bubble unit is directly observable by the user from the second observation surface.

2. The level according to claim 1, wherein the body is formed integrally.

3. The level according to claim 1, wherein the body is a transparent body.

4. The level according to claim 1, wherein the number of the at east one sloping surfaces is one.

5. The level according to claim 1, wherein the number of the at least one sloping surfaces is two.

6. The level according to claim 5, wherein the two sloping surfaces are arranged symmetrically about the bubble unit.

7. The level according to claim 1, wherein the bubble unit is an independent unit that is mounted in a hole of the body.

8. The level according to claim 1, wherein an outer wall of the bubble unit is a hole wall of a hole of the body.

9. The level according to claim 1, wherein a film is coated on the sloping surface.

10. The level according to claim 1, wherein the obtuse angle is ranged from 120°-150°.

11. The level according to claim 1, wherein the obtuse angle is 135°.

12. A bubble level using reflection, comprising:
    an elongate level body which comprises a first surface and a second surface, a cavity being arranged between the first surface and the second surface, the cavity having an opening on the second surface, and the first surface being a datum face for measuring a measured surface;
    a level arranged in the cavity, comprising:
      a body that is a non-opaque body, having at least one sloping surface and a first observation surface;
      at least one bubble unit that is arranged in the body, the bubble unit having a longitudinal axis that is perpendicular to the first surface, the first surface being arranged between a first end of the bubble unit and the measured surface, the first observation surface being parallel to the first surface and being arranged between a second end of the bubble unit and a user;
    wherein the sloping surface and the first surface form an obtuse angle at a side arranged with the bubble unit, and an image of the bubble unit is formed by reflection of the sloping surface;
    wherein the image of the bubble unit reflected by the sloping surface is observed by the user from the first observation surface; and
    wherein the first observation surface of the level is observable by the user via the opening of the second surface;
    wherein the body of the level comprises a second observation surface which is a side of the body, and the bubble unit is directly observable from the second observation surface.

13. The bubble level according to claim 12, wherein the body of the level is formed integrally.

14. The bubble level according to claim 12, wherein the body of the level is a transparent body.

15. The bubble level according to claim 12, wherein a window part is arranged at the opening of the second surface.

16. The bubble level according to claim 12, wherein the body of the level comprises a third surface and a forth surface that are opposedly arranged, the cavity has an opening on at least one of the third surface and the forth surface, and the second observation surface of the level is observable from the opening.

17. The bubble level according to claim 16, wherein a window part is arranged at the opening.

18. The bubble level according to claim 12, wherein the number of the at least one sloping surface of the body of the level is one or two.

19. The bubble level according to claim 18, wherein when the number of the at least one sloping surface of the body of the level is one, the sloping surface of the body of the level is closer to a longitudinal midpoint of the body of the level than the bubble unit of the level is.

20. The bubble level according to claim 18, wherein when the number of the at least one sloping surface of the body of the level is one, the bubble unit of the level is closer to a longitudinal midpoint of the body of the level than the sloping surface of the body of the level is.

21. The bubble level according to claim 12,
   wherein the at least one bubble unit comprises a first bubble unit which is arranged in the middle part of the body of the level, and
   wherein the first bubble unit has a longitudinal axis for measuring the levelness of the measured surface, the longitudinal axis is parallel to the first surface.

22. The bubble level according to claim 12, wherein the body of the level further comprises a first end and a second end.

23. The bubble level according to claim 22, wherein the level is arranged in the first end or the second end of the body of the level.

24. The bubble level according to claim 22, wherein end caps are arranged, respectively, on the first end and the second end of the body of the level.

25. The bubble level according to claim 12, further comprising an illumination means which is arranged between the first surface and the level.

26. The bubble level according to claim 25, wherein the illumination means is a LED light.

* * * * *